(12) United States Patent
Kim

(10) Patent No.: US 6,686,628 B2
(45) Date of Patent: Feb. 3, 2004

(54) LOW-RESISTANCE GATE TRANSISTOR AND METHOD FOR FABRICATING THE SAME

(75) Inventor: Kwan Kim, Chungcheongbuk-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 0 days.

(21) Appl. No.: 10/277,913

(22) Filed: Oct. 23, 2002

(65) Prior Publication Data

US 2003/0038308 A1 Feb. 27, 2003

Related U.S. Application Data

(62) Division of application No. 09/824,576, filed on Apr. 3, 2001, now Pat. No. 6,479,359.

(30) Foreign Application Priority Data

Apr. 30, 2000 (KR) .......................................... 2000-17402

(51) Int. Cl.$^7$ ............................................. H01L 21/336
(52) U.S. Cl. ....................................................... 257/336
(58) Field of Search ................................. 257/197, 336, 257/377; 438/303, 304

(56) References Cited

U.S. PATENT DOCUMENTS

| | | | |
|---|---|---|---|
| 5,091,763 A | 2/1992 | Sanchez | 357/23.9 |
| 5,518,944 A | 5/1996 | Hiroki et al. | 437/44 |
| 5,576,232 A | 11/1996 | Hong | 437/43 |
| 5,599,726 A | 2/1997 | Pan | 437/41 |
| 5,620,914 A | 4/1997 | Hikida et al. | 438/304 |
| 5,858,848 A | 1/1999 | Gardner et al. | 438/305 |
| 5,877,058 A | 3/1999 | Gardner et al. | 438/304 |
| 5,879,999 A | 3/1999 | Park et al. | 438/304 |
| 5,902,125 A | 5/1999 | Wu | 438/300 |
| 6,025,229 A | 2/2000 | Hong | 438/264 |
| 6,083,828 A | 7/2000 | Lin et al. | 438/639 |
| 6,214,677 B1 | 4/2001 | Lee | 438/284 |
| 6,271,089 B1 | 8/2001 | Chen et al. | 438/264 |
| 6,274,446 B1 | 8/2001 | Angello et al. | 438/304 |
| 6,277,700 B1 | 8/2001 | Yu et al. | 438/303 |
| 6,312,998 B1 | 11/2001 | Yu | 438/303 |

OTHER PUBLICATIONS

Stanley Wolf, Silicon Processing for the VLSI Era, vol. 2, Lattice Press 1990, pp. 213–214, and 263.

Primary Examiner—Carl Whitehead, Jr.
Assistant Examiner—Davis S Blum
(74) Attorney, Agent, or Firm—Morgan, Lewis & Bockius LLP

(57) ABSTRACT

Low-resistance gate transistor and method for fabricating the same, in which a metal sidewall is formed at sides of a gate poly-silicon layer to reduce the resistance and the height of a gate, thereby improving the characteristics of a semiconductor device, the low-resistance gate transistor of the present invention including a gate oxide film formed on a semiconductor substrate; a gate formed on the gate oxide film; a first gate sidewall having a vertical pattern in contact with a side of the gate at both sides of the gate and a horizontal pattern formed on the gate oxide film extended from the vertical pattern; second gate sidewalls formed of a material having a resistivity lower than the gate, each having one side in contact with the vertical pattern of the first gate sidewall and a bottom in contact with the horizontal pattern of the first gate sidewall with a round surface; an insulating layer formed on an entire surface including the gate and the first and second gate sidewalls; and, source/drain regions formed in a surface of the semiconductor substrate on both sides of the gate.

7 Claims, 6 Drawing Sheets

LOW-RESISTANCE GATE TRANSISTOR AND METHOD FOR FABRICATING THE SAME

This is a divisional of copending application Ser. No. 09/824,576 filed on Apr. 3, 2001 now U.S. Pat. No. 6,479,359.

This application claims the benefit of Korean Application No. P2000-17402 filed Apr. 3, 2000, which is hereby incorporated by reference.

BACKGROUND OF THE INVENTION

1. Field of the Invention

The present invention relates to a semiconductor device, and more particularly to a low-resistance gate transistor and a method for fabricating the same, in which a metal sidewall is formed at sides of a gate poly-silicon layer to reduce a resistance and a height of a gate, thereby improving performances of a semiconductor device.

2. Background of the Related Art

With reference to the accompanying drawings, a related art semiconductor device will be described.

FIG. 1 is a section showing a related art transistor;

In a memory such as DRAM, and a logic device, a gate resistance causes reduction of a gate capacitance and RC delay of an input signal.

The gate resistance is inevitably caused by a thickness of a gate oxide film, but the solution to this problem is restricted.

Accordingly, in order to overcome the problem of RC delay of an input signal, methods in designing a semiconductor device are under study for reduction of the gate resistance, typically by forming a polycide layer, such as W, Ti, Co, on a gate poly-silicon layer, or depositing a metal, such as W, on the gate poly-silicon layer, to form a gate.

The related art transistor is provided with a semiconductor substrate 1; a gate oxide film 2 formed on the semiconductor substrate 1; a gate poly-silicon layer 3 and a metal layer 4 formed on the gate oxide film 2 in succession; LDD (Lightly Doped Drain) regions 7 formed in a surface of the semiconductor substrate 1 on both sides of a gate line of a stack of the gate poly-silicon layer 3 and the metal layer 4, and aligned with the gate line 1; gate sidewalls 5 formed at sides of the gate poly-silicon layer 3 and the metal layer 4 over the LDD regions; and deep source/drain regions 6 formed in the surface of the semiconductor substrate 1 on both sides of the gate line to be aligned with the gate sidewalls 5.

The foregoing related art transistor has a metal layer 4 formed on a gate poly-silicon layer 3 for reducing the gate resistance for solving the problem of RC delay of an input signal.

The deposition of a polycide layer and a metal layer for reducing the gate resistance results in a structure of gate polysilicon layer+gate polycide layer, or gate poly-silicon layer+metal layer+gate cap dielectric layer, with an increased stack height.

However, the related art transistor employed as a semiconductor memory device or a logic device has the following problems.

The deposition of a polycide layer and a metal layer for reducing the gate resistance increases a total height of the gate. This in turn reduces a fabrication allowance of a following process thus dropping fabrication efficiency.

Particularly, the fabrication efficiency drop in a case of tilted ion injection generally used for extending a halo ion injection region to an inside of a channel, deteriorates the reproducibility and performance of the device, and drops a device's reliability.

SUMMARY OF THE INVENTION

Accordingly, an object of the present invention is to solve at least the problems and disadvantages of the related art.

Another object of the present invention is to provide a low-resistance gate transistor and a method for fabricating the same, in which a metal sidewall is formed at sides of a gate poly-silicon layer to reduce the resistance and the height of a gate, thereby improving performances of a semiconductor device.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a low-resistance gate transistor includes a gate oxide film formed on a semiconductor substrate; a gate formed on the gate oxide film; a first gate sidewall having a vertical pattern in contact with a side of the gate at both sides of the gate and a horizontal pattern formed on the gate oxide film extended from the vertical pattern; second gate sidewalls formed of a material having resistivity lower than the gate, each having one side in contact with the vertical pattern of the first gate sidewall and a bottom in contact with the horizontal pattern of the first gate sidewall with a round surface; an insulating layer formed on an entire surface including the gate and the first and second gate sidewalls; and, source/drain regions formed in a surface of the semiconductor substrate on both sides of the gate.

A method for fabricating a low-resistance gate transistor according to the invention includes steps of: forming a gate oxide film on a semiconductor substrate, and forming a gate thereon; forming a lightly doped impurity region in the surface of the semiconductor substrate using the gate as a mask; forming a layer of a material the same as the gate on an entire surface including the gate to a fixed thickness; forming a layer of a material having resistivity lower than the gate on an entire surface, and patterning the layer of a material the same as the gate and the layer of a material having resistivity lower than the gate to form a first sidewall and a second sidewall; and forming a gate protection insulating layer on an entire surface, and injecting impurity ions heavily to form heavily doped impurity regions in the surface of the semiconductor substrate.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Reference will now be made in detail to the preferred embodiments of the present invention, examples of which are illustrated in the accompanying drawings.

Figure 1:
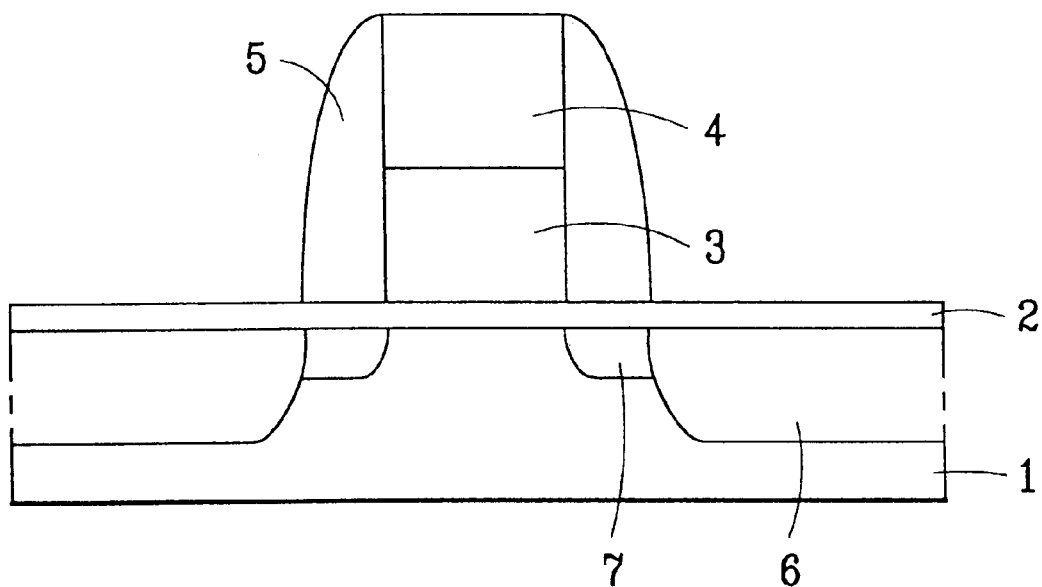
FIG. 1 illustrates a section showing a related art transistor.
Figure 2A:
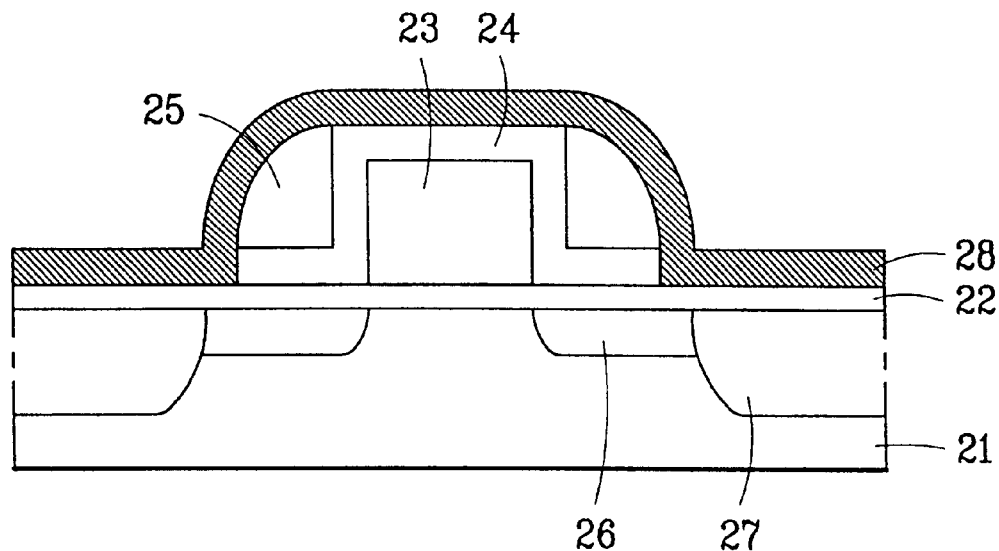
FIGS. 2a and 2b are sectional views each showing a structure of a low-resistance gate transistor in accordance with the present invention.
Figure 2B:
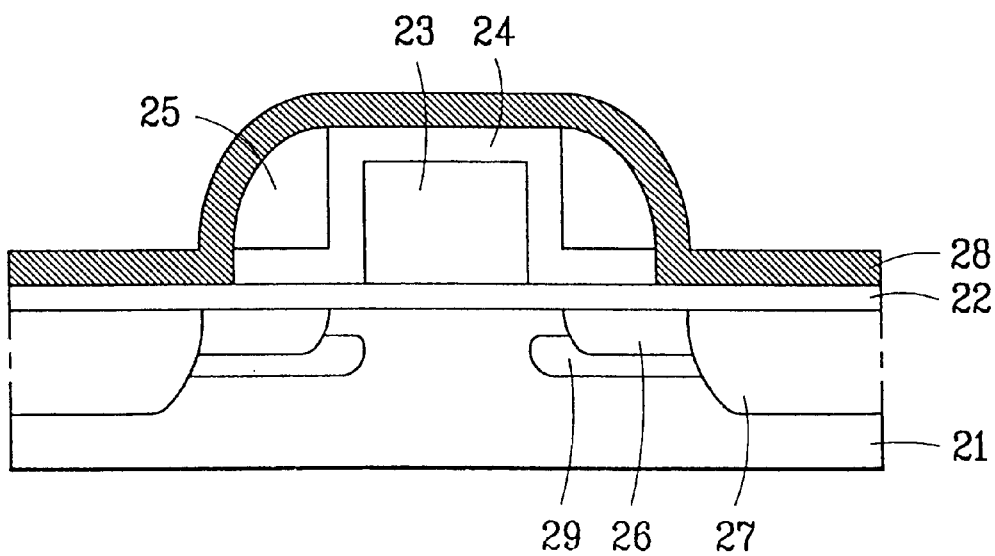

FIGS. 2a and 2b are sectional views each showing a structure of a low-resistance gate transistor in accordance with the present invention.

The present invention suggests formation of a low-resistance layer not on a gate poly-silicon layer, but at sides of the gate poly-silicon layer, for reducing a height of a gate stack, thereby reducing the gate resistance.

Referring to FIG. 2a, a transistor in accordance with a first preferred embodiment of the present invention includes a gate oxide film 22 formed on a surface of a semiconductor substrate 21 having a well region (not shown) formed therein; a gate 23 having a predetermined width formed on the gate oxide film 22; a first gate sidewall 24 having a predetermined thickness of vertical patterns formed at both sides of the gate 23 and horizontal patterns formed on the gate oxide film 22 adjacent to the vertical patterns; second gate sidewalls 25 of a low-resistance material formed at corners made by the vertical patterns and the horizontal patterns, and having tops formed not higher than the top of the first gate sidewall 24; lightly doped impurity regions 26 formed in a surface of the semiconductor substrate 21 on both sides of the gate 23 and aligned with the gate 23 for use as Lightly Doped Drain (LDD) regions; a gate protection insulating layer 28 formed to cover exposed surfaces of the gate oxide film 22 and the first and second gate sidewalls 24 and 25; and heavily doped impurity regions 27 formed in a surface of the semiconductor substrate 21 on both sides of the gate 23 and aligned with the insulating layer 28 for use as deep source/drain regions.

The insulating layer 28 is formed of nitride, which prevents the gate 23 and the first and second gate sidewalls 24 and 25 from being contaminated in a later process.

The first gate sidewall 24 is provided with vertical patterns and horizontal patterns, with the second gate sidewalls 25 being formed on the horizontal patterns that separate the second gate sidewalls 25 from the gate oxide film 22. This arrangement prevents degradation of the gate oxide film 22 which could result if the low-resistance metal layers used as the second gate sidewalls 25 were in direct contact with the gate oxide film 22.

Referring to FIG. 2b, a transistor in accordance with a second preferred embodiment of the present invention includes a gate oxide film 22 formed on a surface of a semiconductor substrate 21 having a well region (not shown) formed therein; a gate 23 having a predetermined width formed on the gate oxide film 22; a first gate sidewall 24 having a predetermined width of vertical patterns formed at both sides of the gate 23 and horizontal patterns formed on the gate oxide film 22 adjacent to the vertical patterns; second gate sidewalls 25 of a low-resistance material formed at corners made by the vertical patterns and the horizontal patterns, and having tops formed not higher than the top of the first gate sidewall 24; halo ion implanting regions 29 formed at a depth under a surface of the semiconductor substrate 21 on both sides of the gate 23 and aligned with the gate 23; lightly doped impurity regions 26 formed at a depth less than the halo ion implanting regions 29, partially overlapping with the halo ion implanting regions 29, aligned with the first gate sidewall 24, for use as LDD regions; a gate protection insulating layer 28 formed on exposed surfaces of the gate oxide film 22 and the first and second gate sidewalls 24 and 25; and heavily doped impurity regions 27 formed in a surface of the semiconductor substrate 21 on both sides of the gate 23 and aligned with the insulating layer 28 for use as deep source/drain regions.

The insulating layer 28 is formed of nitride.

The halo ion implanting region 29 is formed by implanting ions of the same conduction type as the well for enhancing a well doping concentration in particular regions to enlarge a depletion layer at a junction of the source/drain for preventing the source/drain regions from coming into contact.

A fabricating process of the aforementioned low-resistance transistor of the present invention will be described. First, a fabricating process of the low-resistance transistor in accordance with a first preferred embodiment of the present invention shown in FIG. 2a will be described. FIGS. 3a to 3d are sectional views showing the steps of a process for fabricating a low-resistance gate transistor in accordance with a first preferred embodiment of the present invention.

Figure 3A:
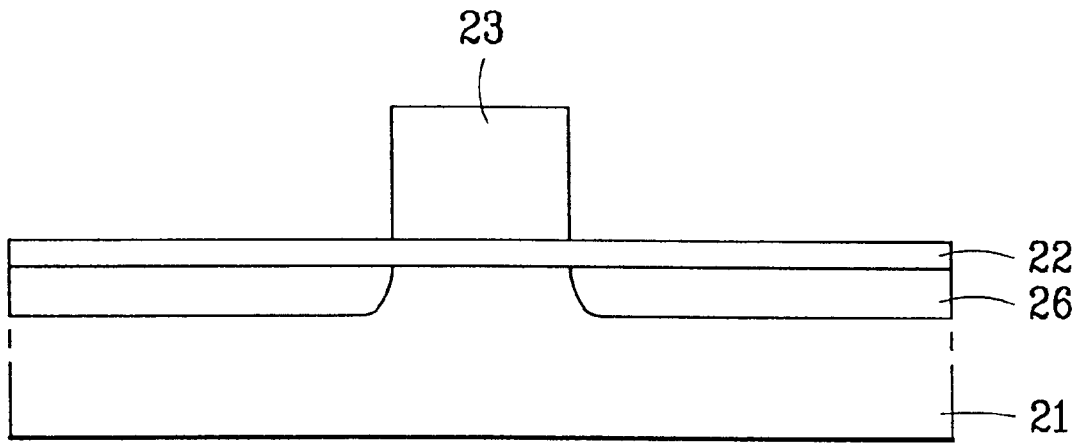
FIGS. 3a to 3d are sectional views showing the steps of a process for fabricating a low-resistance gate transistor in accordance with a first preferred embodiment of the present invention.

Referring to FIG. 3a, a gate oxide film 22 is formed on a semiconductor substrate 21 having a well region (not shown) formed therein.

Next, a poly-silicon layer is formed on the gate oxide film 22, and subjected to selective patterning by photolithography to form a gate 23.

Impurity ions are lightly doped by using the gate 23 as a mask to form lightly doped impurity regions 26 which will be used as LDD regions.

Figure 3B:
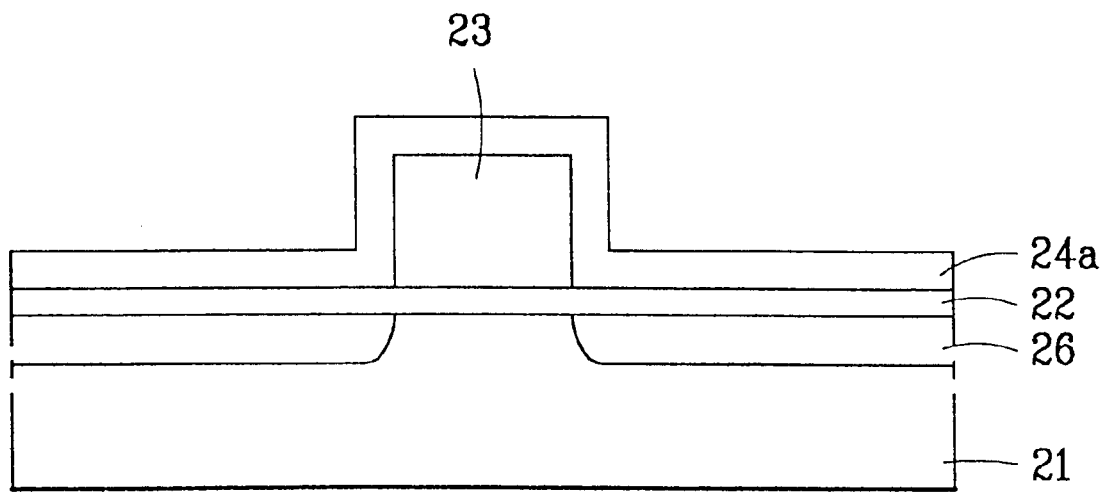

Then, as shown in FIG. 3b, a poly-silicon layer 24a is formed on an entire surface having the gate 23 formed thereon to a fixed thickness.

Figure 3C:
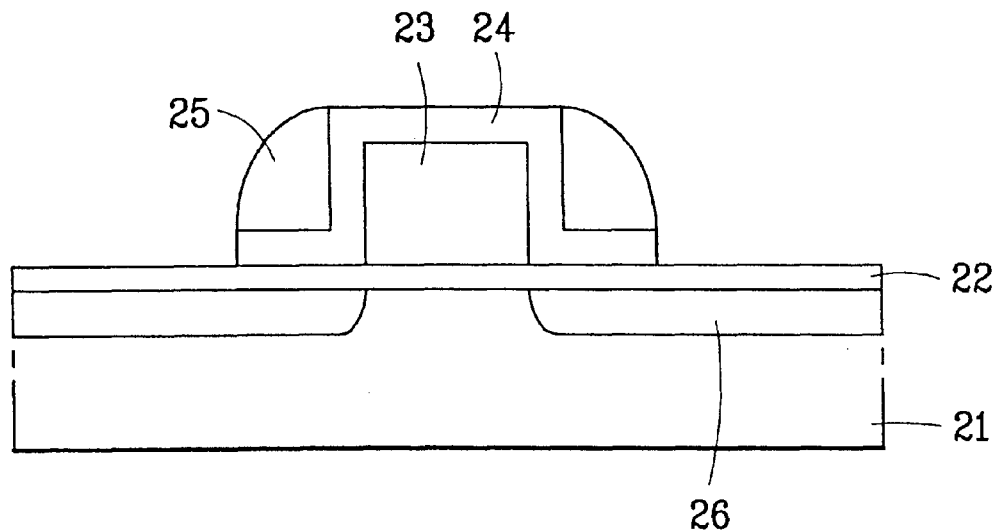

As shown in FIG. 3c, a layer of a low-resistance material for reducing gate resistance, for example, a tungsten layer, is formed on an entire surface of the poly-silicon layer 24a, and etched back, together with the poly-silicon layer 24a to form a first gate sidewall 24 having vertical patterns and horizontal patterns at both sides of the gate 23, and second gate sidewalls 25 of a low-resistance material each with a round surface.

Thus, dual sidewall spacers each having the first gate sidewall 24 formed of the same material as the gate 23, i.e., polysilicon, and the second gate sidewalls 25 formed of the low-resistance material are formed at both sides of the gate 23, a main wire line of the gate, in a form that the first gate sidewall 24 and the second gate sidewalls 25 are overlapped.

Figure 3D:
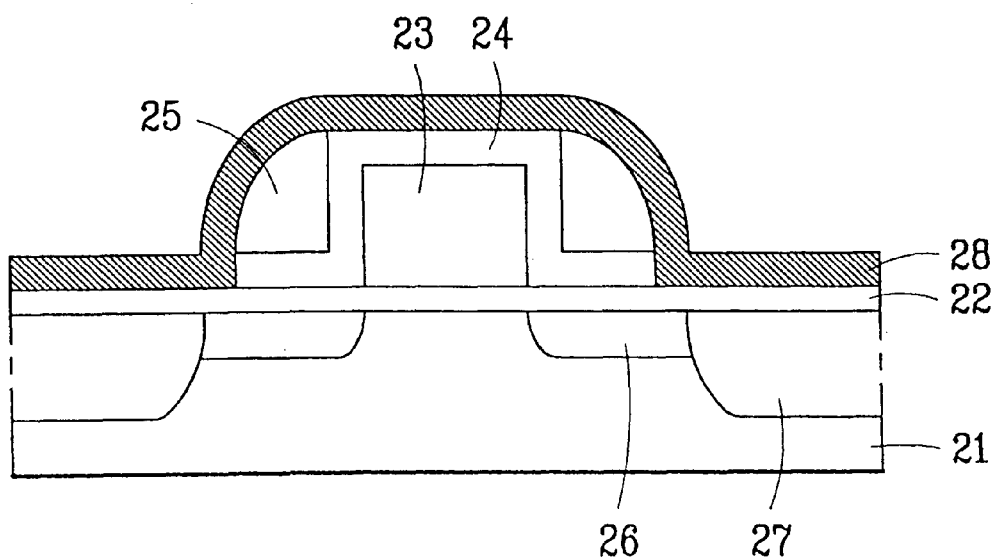

Next, as shown in FIG. 3d, as a layer for preventing possible metal contamination in a later process, an insulating layer 28, for example, a nitride layer, is formed on an entire surface having the gate 23 and the first and second gate sidewalls 24 and 25 formed thereon, and impurity ions are heavily doped to form heavily doped impurity regions 27 for use as deep source/drain regions.

A fabricating process of a low-resistance transistor in accordance with a second preferred embodiment of the present invention shown in FIG. 2b will be described. FIGS. 4a to 4d are sectional views showing the steps of a process for fabricating a low-resistance gate transistor in accordance with a second preferred embodiment of the present invention.

Figure 4A:
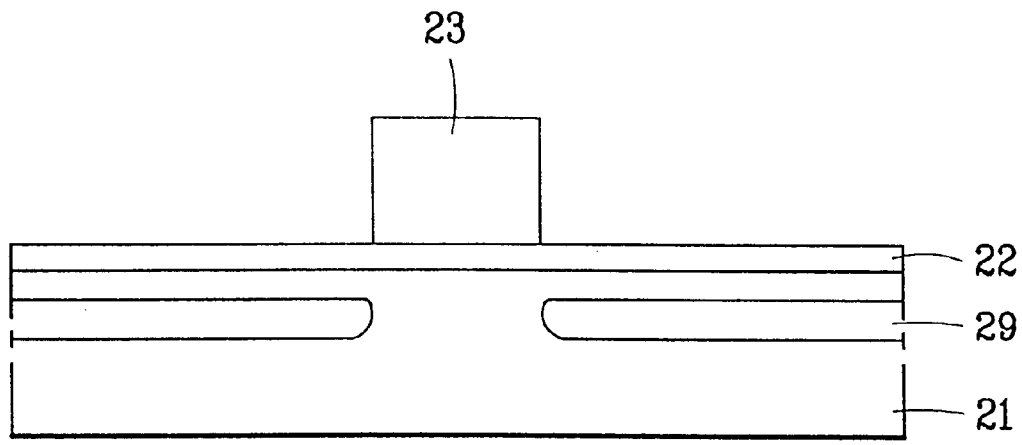
FIGS. 4a to 4d are sectional views showing the steps of a process for fabricating a low-resistance gate transistor in accordance with a second preferred embodiment of the present invention.

Referring to FIG. 4a, a gate oxide film 22 is formed on a semiconductor substrate 21 having a well region (not shown) formed therein.

Next, a poly-silicon layer is formed on the gate oxide film 22, and subjected to selective patterning by photolithography to form a gate 23.

Selective ion implanting process is carried out by using the gate 23 as a mask to form halo ion implanting regions 29 for enhancing a well doping concentration in particular regions.

Figure 4B:
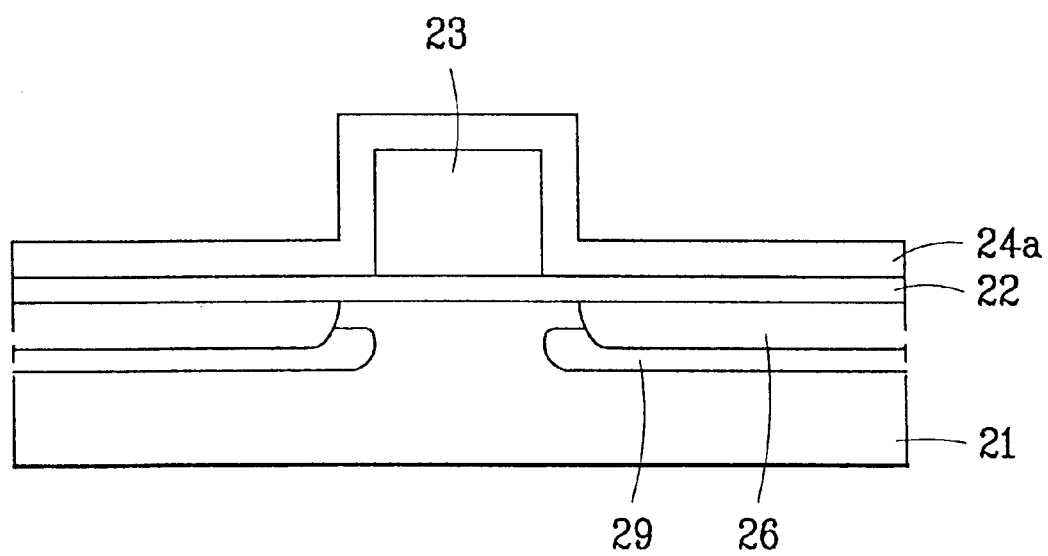

Then, as shown in FIG. 4b, a poly-silicon layer 24a is formed on an entire surface having the gate 23 formed thereon to a fixed thickness.

Impurity ions are lightly doped selectively by using the gate 23 as a mask including the poly-silicon layer 24a to form lightly doped impurity regions 26 for use as LDD regions.

Figure 4C:
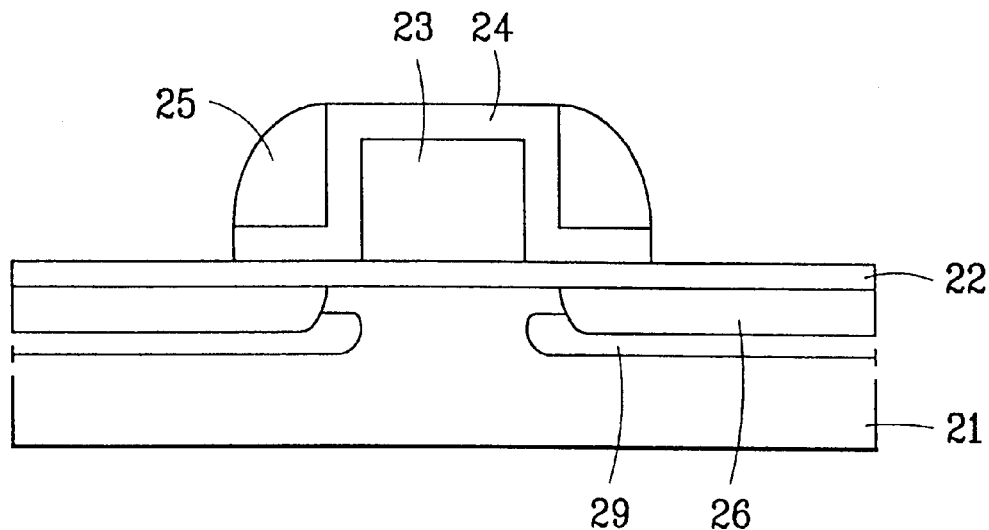

As shown in FIG. 4c, a layer of a low-resistance material for reducing gate resistance, for example, a tungsten layer, is formed on the poly-silicon layer 24a, and etched back, together with the poly-silicon layer 24a to form a first gate sidewall 24 having vertical patterns and horizontal patterns at both sides of the gate 23, and second gate sidewalls 25 of a low-resistance material each with a round surface.

Thus, dual sidewall spacers each having the first gate sidewall 24 formed of the same material as the gate 23, i.e., polysilicon, and the second gate sidewalls 25 formed of the low-resistance material are formed at both sides of the gate 23, a main wire line of the gate, in a form that the first gate sidewall 24 and the second gate sidewalls 25 are overlapped.

Figure 4D:
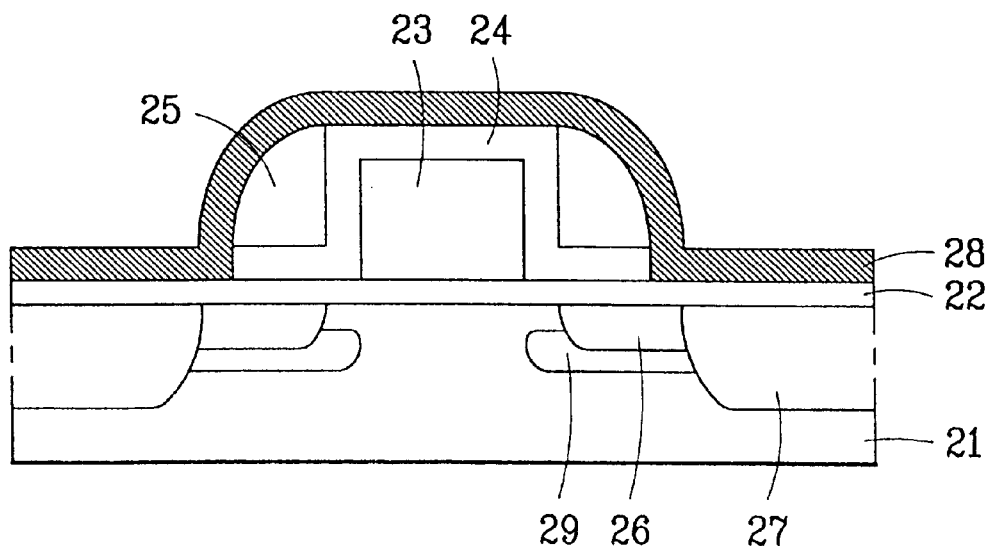

Next, as shown in FIG. 4d, as a layer for preventing possible metal contamination in a later process, an insulating layer 28, for example, a nitride layer, is formed on an entire surface having the gate 23 and the first and second gate sidewalls 24 and 25 formed thereon, and impurity ions are heavily doped to form heavily doped impurity regions 27 for use as deep source/drain regions.

In the fabricating process of the low-resistance gate transistor in accordance with the second preferred embodiment of the present invention, since the halo ion implanting region 29 is formed using the gate 23 as a mask prior to forming the first gate sidewall 24 having the vertical and horizontal patterns, the halo ion implanting region can be extended to an inside of a channel by the first gate sidewall 24 even if no tilted ion implanting process is employed.

Also, according to the low-resistance gate transistor and the method for fabricating the same of the present invention, the low-resistance layer is formed not on the gate poly-silicon layer, but at sides of the gate poly-silicon layer, for reducing a height of a gate stack, thereby reducing the gate resistance.

As described above, the low-resistance gate transistor and the method for fabricating the same of the present invention have the following advantages.

The drop of gate resistance and prevention of a total height increase of the gate by providing a low-resistance layer which can reduce the gate resistance, not on the gate, but at sides of the gate provides a greater fabrication allowance, which is particularly effective for securing an easy cell plug forming process or ILD burying process.

Such increased fabricating efficiency improves the reproducibility and operating performances of a semiconductor device, and thus the device's reliability.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A low-resistance gate transistor comprising:

a gate oxide film formed on a semiconductor substrate;

a gate formed on the gate oxide film;

a first gate sidewall having a vertical pattern in contact with a side of the gate at both sides of the gate and a horizontal pattern formed on the gate and the gate oxide film extended from the vertical pattern;

second gate sidewalls formed of a material having a resistivity lower than the gate, each of said second gate sidewalls having one side in contact with the vertical pattern of the first gate sidewall and a bottom in contact with the horizontal pattern of the first gate sidewall, and said second gate sidewalls each having a round surface, wherein a top surface of the second gate sidewalls is at a same height as or lower than a top surface of the first gate sidewall;

an insulating layer on an entire surface including the gate and the first and second gate sidewalls; and source/drain regions in a surface of the semiconductor substrate on both sides of the gate.

2. The low-resistance gate transistor as claimed in claim 1, wherein the gate and the first gate sidewall are of polysilicon.

3. The low-resistance gate transistor as claimed in claim 1, wherein the second gate sidewalls are of tungsten.

4. The low-resistance gate transistor as claimed in claim 1, wherein an outside edge of a bottom of each of the second gate sidewalls is aligned with the horizontal pattern of the first gate sidewall.

5. The low-resistance gate transistor as claimed in claim 1, the source/drain region includes a lightly doped impurity region and a heavily doped impurity region in contact with the lightly doped impurity region, and the lightly doped impurity region is aligned with the first gate sidewall.

6. The low-resistance gate transistor as claimed in claim 1, the source/drain region includes a lightly doped impurity region and a heavily doped impurity region in contact with the lightly doped impurity region, and the lightly doped impurity region is aligned with the gate.

7. The low-resistance gate transistor as claimed in claim 1, further comprising a halo ion implanting region in a surface of the semiconductor substrate under the first and second gate sidewalls.

* * * * *